United States Patent [19]
Comment

[11] Patent Number: 4,723,725
[45] Date of Patent: Feb. 9, 1988

[54] PRESSURE REDUCER/REGULATOR FOR DISPENSING A GASEOUS, LIQUID, VISCOUS, POWDERY OR PASTY PRODUCT

[75] Inventor: Paul Comment, Courgenay, Switzerland

[73] Assignee: Etablissements Technospray, Vaduz, Liechtenstein

[21] Appl. No.: 908,699

[22] PCT Filed: Dec. 24, 1985

[86] PCT No.: PCT/CH85/00182

§ 371 Date: Aug. 26, 1986

§ 102(e) Date: Aug. 26, 1986

[87] PCT Pub. No.: WO86/04163

PCT Pub. Date: Jul. 17, 1986

[30] Foreign Application Priority Data

Dec. 28, 1984 [CH] Switzerland .................. 6213/84

[51] Int. Cl.⁴ .................................................. B05B 1/30
[52] U.S. Cl. .................................. 239/533.1; 239/570; 137/509; 222/496
[58] Field of Search ............... 222/518, 496; 239/533.1, 570; 137/509

[56] References Cited

U.S. PATENT DOCUMENTS

| | | | |
|---|---|---|---|
| 1,651,971 | 12/1927 | Shield | 137/509 |
| 1,735,718 | 11/1929 | Attendu | 137/509 |
| 3,099,997 | 8/1963 | Kroffke | 137/509 |
| 3,159,350 | 12/1964 | Mangold | 137/509 |
| 4,082,225 | 4/1978 | Haynes | 239/533.1 |
| 4,486,039 | 12/1984 | Jayne | 222/518 |

FOREIGN PATENT DOCUMENTS

| | | |
|---|---|---|
| 970737 | 1/1951 | France . |
| 1136879 | 5/1957 | France . |
| 82/00450 | 2/1982 | World Int. Prop. O. . |
| 618896 | 8/1980 | Switzerland . |
| 2144520 | 3/1985 | United Kingdom . |

*Primary Examiner*—H. Grant Skaggs
*Attorney, Agent, or Firm*—Emmanuel J. Lobato; Robert E. Burns

[57] ABSTRACT

A pressure regulator-reducer in a first embodiment comprises two pistons (6, 7) provided with elastically deformable rings (9, 10) mounted in a bore (5) and held by a spring (12) bearing against a bulkhead packing (13) surrounding an outlet orifice (16). The double piston defines three chambers (19, 20, 21) respectively in communication with the product under pressure, the atmospheric pressure and the outlet. Facing the ring of the piston (6) on the outlet side there is provided a narrow longitudinal slot (24). A second pressure regulator-reducer is also disclosed that uses a slide mounted in a bore. The side has a piston and a spaced shoulder. The shoulder and piston controls flow along the bore to a dispensing orifice. A spring, mounted in the bore, controls the movement of the side in response to fluid flow.

7 Claims, 9 Drawing Figures

PRESSURE REDUCER/REGULATOR FOR DISPENSING A GASEOUS, LIQUID, VISCOUS, POWDERY OR PASTY PRODUCT

The subject of the present invention is a pressure reducer/regulator for dispensing a gaseous, liquid, viscous, powdery or pasty product, comprising a body provided with a cylindrical bore, in which are mounted two pistons fixed rigidly to one another and equipped with elastically deformable segments, and a spring working under compression between the front (sic) of the bore and one of the pistons and, at rest, keeping the pistons up against a stop located opposite the other piston, a first radial port opening out between the pistons and communicating with the high pressure, and a second radial port in the region of the segment of one of the pistons forming the low-pressure outlet, the chamber formed between the other piston and the bottom of the bore being connected to the atmospheric pressure.

A reducer/regulator of this type is described in Swiss Patent No. 618,896. In this prior reducer/regulator, the radial port located in the region of the segment of one of the pistons consists of a cylindrical hole. Now because of the mode of operation of this reducer/regulator, which moreover is surprising and has required considerable time to analyze, the sensitivity of the pressure reducer/regulator is very high, that is to say a minute movement of the double piston causes a great variation in pressure, thus making very fine adjustment necessary. As a result of this, it is very difficult to achieve series assembly.

The main object of the present invention is to reduce the sensitivity of such a reducer/regulator, so that it can be assembled in series, without the need to carry out an adjustment of the the position of rest of the double piston.

To achieve this, the pressure reducer/regulator according to the invention is defined in that the port located in the region of the segment of one of the pistons consists of at least one longitudinal slot, the stroke of the pistons in the direction of the spring being limited by a stop, in such a way that when the corresponding piston is up against this stop, the passage between the central chamber and the cavity through the longitidinal slot is not completely closed.

The effect of this modification is not only to allow series assembly without subsequent adjustment, but also to make it possible to convey through the reducer/regulator not only a gas, as intended in Swiss Patent No. 618,896, but any product capable of flowing through a macro-orifice, that is to say both liquid products and viscous, powdery or even pasty products. This second advantage affords new possibilities in the dispensing of various products, and consequently the object of the present invention is also to mount the pressure reducer/regulator according to the invention in a dispensing head intended to be fitted on a vessel containing a pressurized product and equipped with a valve, the pressure reducer/regulator being assembled directly in series with the valve and having the product to be dispensed passing through it.

The position of the spring depends on the use of the pressure reducer/regulator. In a use, such as that described in Swiss Patent No. 618,896, the spring will be fitted so as to bear against the piston interacting with the low-pressure outlet port, as described in this patent, whereas in a use in a dispensing head the spring will be fitted so as to bear against the other piston.

According to an economical alternative embodiment comprising fewer components than the device defines (sic) above, the pressure reducer/regulator comprises a body provided with a cylindrical bore, in which is mounted a single piston equipped with an elastically deformable segment and a spring working under compression against the bore bottom and the piston and, at rest, keeping the piston up against a stop, the bore having a first axial port opening out on the side of the piston opposite the spring and communicating with the high pressure, a radial port in the region of the segment of the piston forming the low-pressure outlet and consisting of at least one longitudinal slit made in the wall of the bore and extending on either side of the segment, in the position of rest of the piston, the stroke of the piston in the direction of the spring being limited by a stop, in such a way that, when the piston is up against this stop, the passage through the longitudinal slit is not completely closed. This alternative embodiment operates on the same principle as the main embodiment.

The attached drawing illustrates by way of example one embodiment of the invention.

Figure 1:
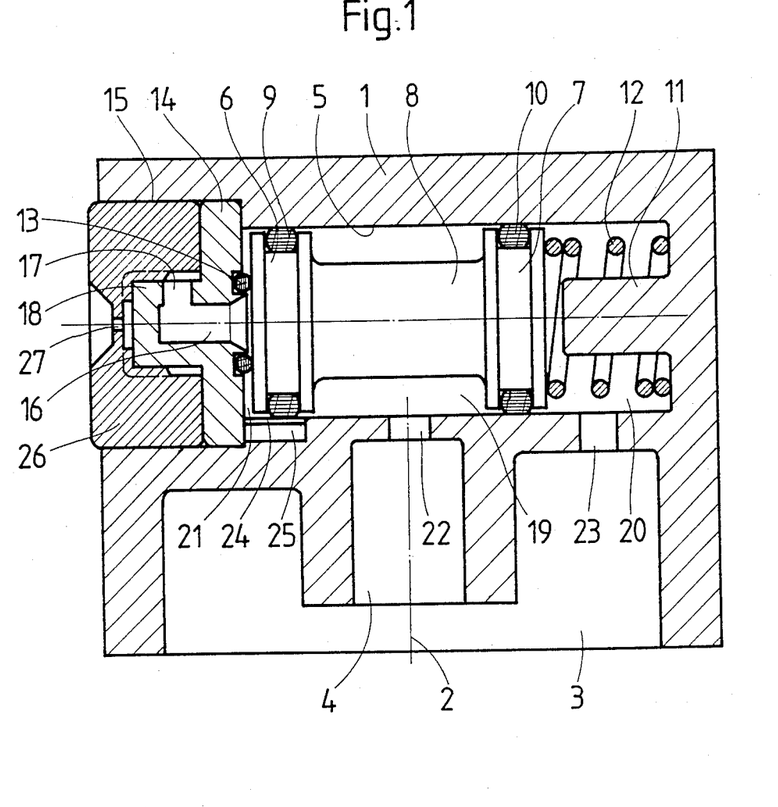
FIG. 1 is a view in axial section of a pressure reducer/regulator mounted in a dispensing head, in a position of rest.

FIG. 1 shows a cylindrical dispensing head 1 of axis 2. This head has a cylindrical recess 3 intended for capping a vessel containing a pressurized product, for example a cylindrical can equipped with a valve capable of being opened by means of axial pressure. This type of valve is well known; in the center of the recess 3, the head 1 has an endpiece 4 intended to be fastened to the valve of the vessel in a sealed manner.

Machined in the head 1 is a bore 5, in which are mounted two pistons 6 and 7 connected rigidly to one another by means of a spindle body 8. These pistons are each provided with a groove, in which is fitted an elastically deformable segment 9, 10 respectively consisting of an O-ring. The distance between the piston and the bore is greater than 0.1 mm, so as to allow a very slight movement of the piston solely as a result of the elastic deformation of the segments 9 and 10. The bore 5 does not pass completely through the head 1, and its bottom has a protuberance 11 serving as a stop limiting the stroke of the piston 7. Seated round this protuberance 11 is a spring 12 which works under compression and which tends to keep the piston 6 up against a gasket 13 accommodated in a groove of a circular piece 14 fitted hermetically in a cylindrical receptacle 15 extending the bore 5 axially. This piece 14 has an axial channel 16, of which the entrance on the same side as the piston is surrounded by the gasket 13 and which opens radially at 17 onto a cylindrical bearing surface 18 of the piece 14.

Figure 2:
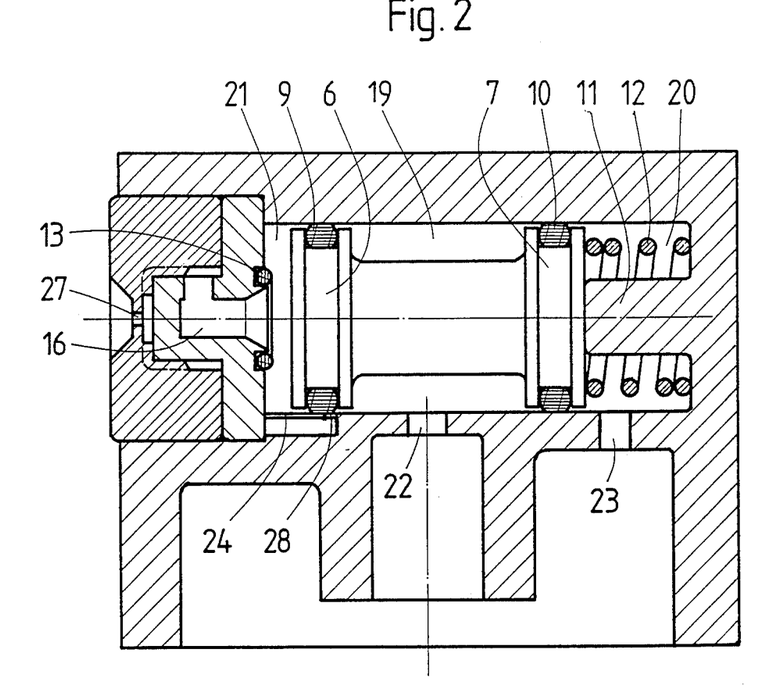
FIG. 2 is a sectional view similar to that of FIG. 1, showing the piston pushed completely to the rear.

The pistons 6 and 7 divide the bore 5 into three chambers, namely a central chamber 19 between the pistons 6 and 7, a rear chamber 20 containing the spring 12, and a front chamber 21 located in front of the piston 6. The central chamber 19 communicates via a radial port 22 with the valve of the vessel containing the pressurized product. The rear chamber 20 communicates via a radial port 23 with the atmospheric pressure. The chamber 21 is connected to the chamber 19 by means of a narrow slot 24 extending on either side of the segment 9 in the position of rest of the piston and by means of a cavity 25, into which the slot 24 opens. The slot 24 has, for example, a width of 0.33 mm. The length of the slot 24 is such that, when the double piston 6–7 is up against the protuberance 11, an extremely reduced passage still remains between the chamber 19 and the cavity 25, that is to say the chamber 21 (FIG. 2).

In the example illustrated, the dispensing head 1 is completed by a nozzle 26 fastened in the head by means of a bayonet device or by screwing on the bearing surface 18 and provided with channels connecting the radial outlet 17 to a spray orifice 27.

According to measurements carried out by means of pressure gages and observations made on a transparent head 1, the mode of operation of the pressure reducer/regulator seems to be as follows: when the valve is opened and the pressurized product penetrates into the chamber 19, some of the product flows into the chamber 21 via the slot 24. At rest, this chamber 21 is closed in a sealed manner because the face of the piston bears against the gasket 13, thus resulting in an increase in pressure in this chamber 21, the effect of this pressure increase being to push the double piston 6–7 to the rear, at the same time compressing the spring 12. Simultaneously, the chamber 21 is put in communication with the nozzle 26 via the channel 16, and the product can escape through the spray orifice 27, the effect of which is to cause the pressure in the chamber 21 to drop. The spring 12 then pushes the piston 6 back to the left, and this once again allows a certain amount of product to pass from the chamber 19 to the chamber 21 via the slot 24, once more causing an increase in the pressure in the chamber 21, especially as a certain pressure continues to prevail in the channel 16, because of the small cross-section of the orifice 27 of the nozzle. The effect of the pressure increase in the chamber 21 is, once again, to push the double piston to the rear. The double piston 6–7 is thus driven in a damped oscillating movement, finally becoming stabilized in a position of equilibrium. The calibration of the spring 12 makes it possible to obtain the desired pressure reduction.

It is appropriate to note that the gasket 13 is not necessary for the device to operate, because an increase of the pressure in the chamber 21 will at all events occur when the chamber 19 is suddenly connected to the pressurized vessel, owing to the resistance offered to the flow of the product by the nozzle and its channels. However, the advantage of the gasket 13 is that it closes the bore 5 at rest, that is to say isolates the chambers 19 and 21 from the outside and consequently prevents oxidation of the product, a certain quantity of which remains in its chambers. The product is also prevented from dripping after the valve has been closed.

Figure 3:
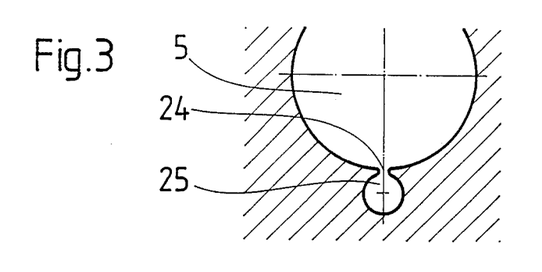
FIG. 3 is a partial sectional view according to III---III of FIG. 1, without the piston.
Figure 4:
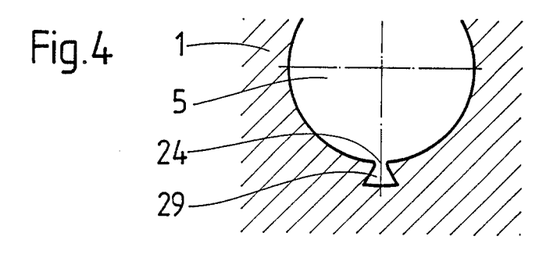
FIG. 4 is a sectional view, similar to that shown in FIG. 3, of an alternative embodiment.
Figure 5:
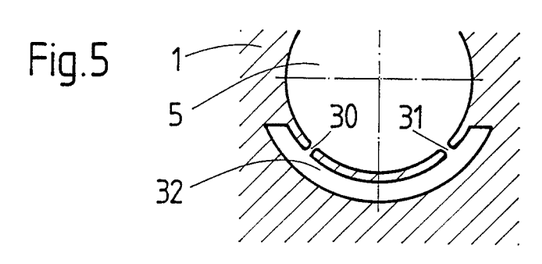
FIG. 5 is a sectional view, similar to that of FIG. 3, of a second alternative embodiment.

The chamber 25 can have another form than that shown in FIG. 3. FIG. 4 illustrates an alternative embodiment, in which the slot 24 communicates with a dove-tail-shaped cavity 29. It is also possible to provide several slots, for example two slots 30 and 31 (FIG. 5), communicating with a common cavity 32.

Figure 6:
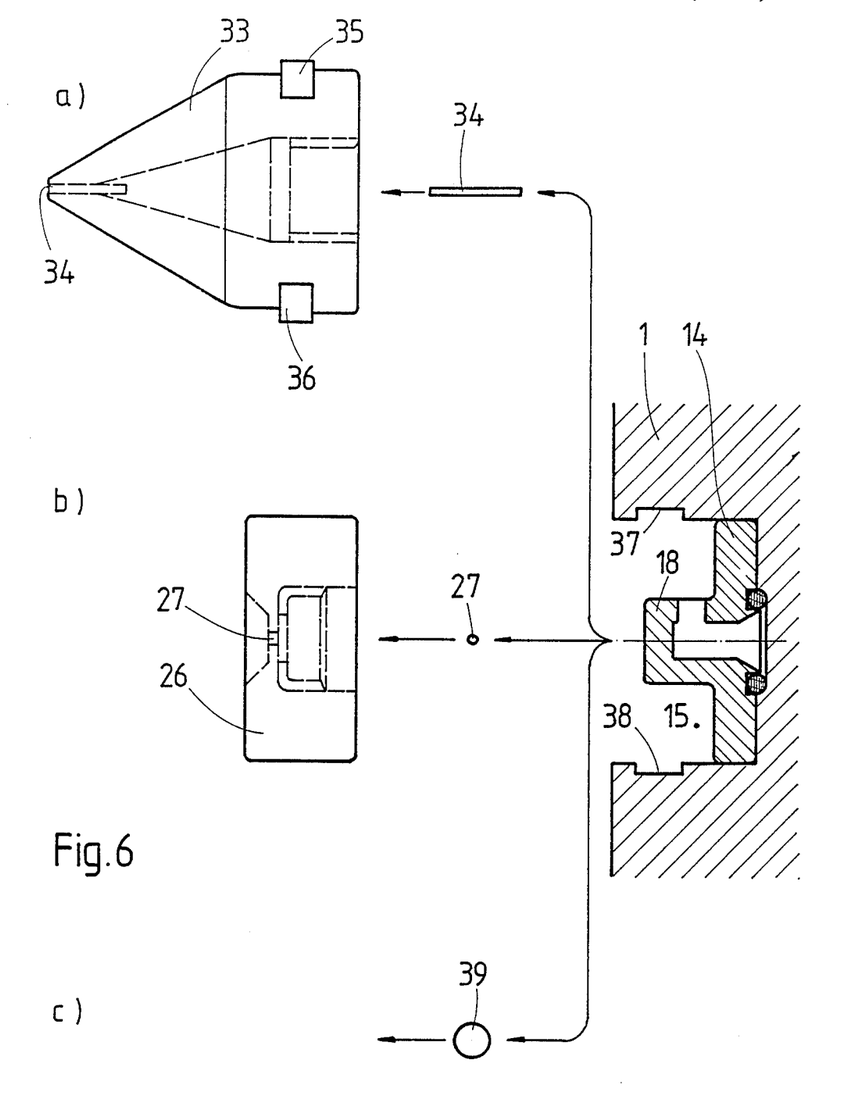
FIG. 6 illustrates some examples of endpieces capable of being fitted on the dispensing head.

In the embodiment illustrated, the head 1 makes it possible to fasten various endpieces, as shown by some examples in FIG. 6. In FIG. 6a, there is a nose 33 provided, at its end, with a rectangular slit 34, the profile of which is shown on the right. This endpiece is equipped with two projections 35 and 36 intended for its bayonet fastening in two grooves 37 and 38 in the receptacle 15 of the head. Such an endpiece will be used for simple spreading, for example to spread glue, varnish, cream or purée. FIG. 6b shows the endpiece 26 of FIG. 1 which can be used for spraying. This endpiece can either have a bayonet fastening or be screwed to the bearing surface 18 of the piece 14. FIG. 6c simply shows the cross-section 39 of another dispensing endpiece for other uses. Powder extinguishers will be mentioned as an example.

The pressure reducer/regulator according to the invention can be made of metal or of synthetic material.

If the reducer/regulator according to the invention is used to reduce the pressure of an auxiliary tank containing pressurized gas used as a propellant gas in a system such as that described in Swiss Patent No. 618,896, the spring 12 will usually be mounted between the piston interacting with the outlet slit on the low-pressure side and the opposite bottom of the bore.

An economical alternative embodiment having fewer components than the above-described device will now be described with reference to FIGS. 7 to 9.

Figure 7:
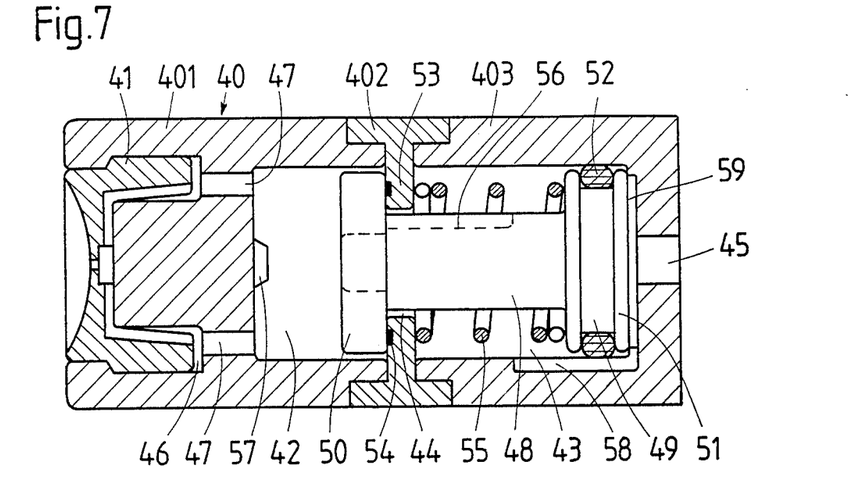
FIG. 7 is a view in axial section of an economical alternative embodiment, in the position of rest.
Figure 8:
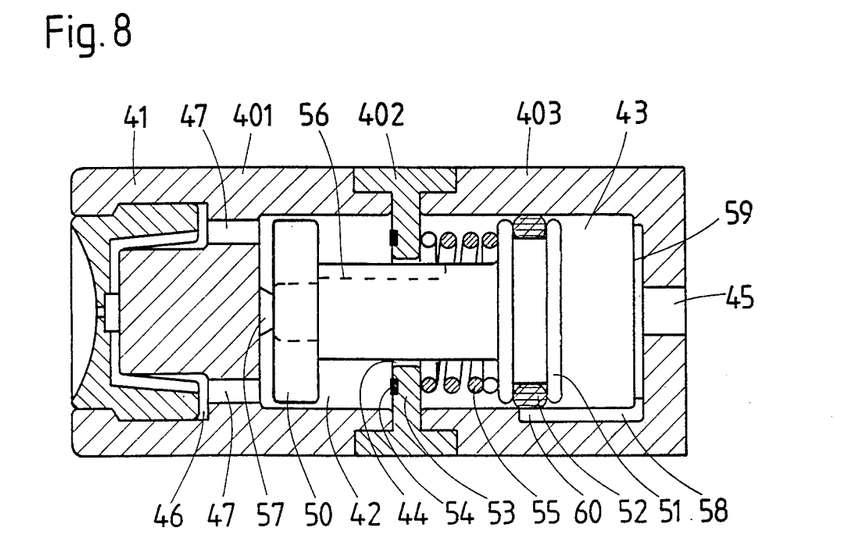
FIG. 8 shows a same alternative form in a working position.

FIG. 7 shows the device in the state of rest. It is composed of a main body 40 consisting of three cylindrical parts 401, 402 and 403 which are welded to one another and which can be made of synthetic material. Mounted in this body 41 is a removable nozzle 41 known per se, similar to the nozzle 26 of the main embodiment. The main body 40 has two cylindrical chambers 42 and 43 connected to one another by means of a central passage 44, and an axial port 45 opening into the chamber 43 and forming the inlet port for the high-pressure product to be diffused. According to a known design, the nozzle 41 or diffusion insert is accommodated in an annular diffusion chamber 46 formed in the main body. A certain number of passages 47 connect the chamber 42 to the diffusion chamber 46. A cylindrical slide 48 is seated so as to be axially movable in the two chambers 42 and 43. This slide has a cylindrical shoulder 49 at one of its ends and an attached cylindrical shoulder 50 at the other end. The shoulder 49 is provided with an annular groove 51, in which is fitted an O-ring 52 ensuring sealing of the chamber 43 which constitutes a bore for the piston formed by the shoulder 51 and its segment 52. The shoulder 50 of the metal slide moves freely, with play, in the cylindrical chamber 42. Via its face turned towards the piston, at rest the shoulder 50 comes up against an annular shoulder 53 formed by the middle portion 402 of the body 40 and surrounding the axial passage 44 between the chambers. A gasket 54 fastened axially to the face of the shoulder 53 opposite the shoulder 50 of the slide guarantees a sealed closure between the chambers 42 and 43 at rest, under the action of a spring 55 working under compression between the other face of the shoulder 53 and the piston 49 in the chamber 43. The central part of the slide 43 has a slit 56 parallel to the axis, ensuring free passage between the chambers 43 and 42 when the slide moves to the left in the drawing. The bottom of the chamber 42 on the same side as the nozzle has a boss 57 limiting the stroke of the slide 48 to the left, so that the shoulder 50 does not block the passages 47.

In line with the O-ring 52 of the piston, the wall of the bore 43 has at least one longitudinal slit 58 extending on either side of the O-ring 52 at rest. This slit or these slits can, for example, have one of the profiles shown in FIGS. 3, 4 and 5.

In the position of rest illustrated in FIG. 7, a narrow chamber 59 is also provided between the piston 51 and the axial inlet port 45. This device operates as follows:

When the product under high pressure, released by means of a conventional valve (not shown), penetrates into the chamber 59 via the inlet port 45, the slit 58 in the chamber 43 causes a restriction in the passage cross-section for the product. The latter then exerts pressure on the walls of the chamber 43 and on the face 60 of the piston 49. This pressure causes the slide 48 to move to the left, at the same time compressing the spring 55. The slide 48 moves until it comes up against the boss 57. In this position, only a very small passage 60 remains between the end of the slit 58 and the O-ring 52 (FIG. 8). During the flow of the product through this passage 60 into the chamber 43, the pressure of the product is greatly reduced. This pressure drop is proportional to the size of the passage 60. Now the size of the passage 60 is a function of the position of the O-ring 52 in relation to the slit 58. A counter-pressure nevertheless builds up on the other face of the piston 49 in the chamber 43 and, added to that of the spring 55, tends to push the piston 49 to the right. This piston 49 finally assumes a position of equilibrium between the pressures exerted on the two sides of the piston 49.

Consequently, the product continues to flow at low pressure towards the nozzle 41, passing via the axial passage 44, this being made easier by the slit 56, the chamber 42 and the passages 47.

When the high pressure of the product decreases at the inlet of the device as a result of a normal pressure reduction in the tank (not shown), the pressure at the inlet of the device likewise decreases and finally becomes less than the counter-pressure exerted by the spring 55 and the low-pressure product in the left-hand part of the chamber 43. The spring 55 is thus able to push the piston 49 to the right, thereby enlarging the passage 60, so that the product passes more easily and the pressure drop through this passage 60 is less.

When the pressure of the product in the left-hand part of the chamber 43 has decreased sufficiently to reach the minimum spray pressure value, the slide 48 resumes approximately the position shown in FIG. 7 under the action of the spring 55.

If the pressure were to decrease even further, spraying would no longer take place properly. In this event, the shoulder 50 of the slide 48 comes to bear against the gasket 54 of the shoulder 53 and closes the chamber 43, preventing the product from leaving the chamber 42 at too low a pressure.

Figure 9:
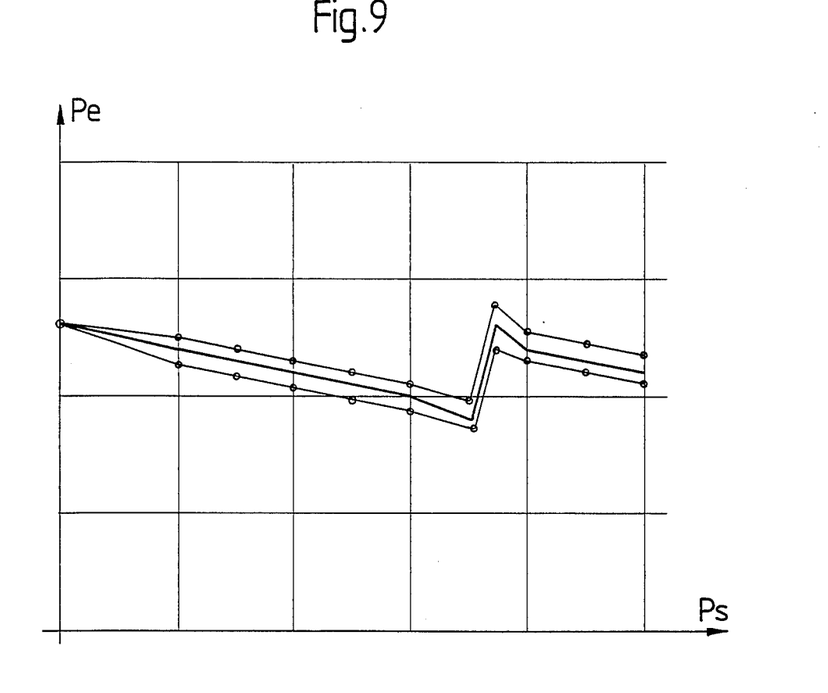
FIG. 9 illustrates the regulating diagram of this alternative embodiment.

The regulation carried out by the device described above is illustrated by means of the diagram shown in FIG. 9. The decreasing value of the pressure Pe of the product at the inlet of the device is plotted on the ordinate. The regulated pressure Ps measured in the diffusion chamber 46 is plotted on the abscissa.

I claim:

1. A pressure reducer-regulator for dispensing gaseous, liquid, viscous, powdery or pasty substances comprising, a body having an internal cylindrical bore therein, two paired pistons integrally connected disposed reciprocable in said bore, a nozzlepiece at one end of the bore having a nozzle orifice, each of said two pistons defining a corresponding end of the paired pistons, a spindle integrally connecting the two pistons axially spaced from each other and having a diameter less than either piston diameter, the axially spaced paired pistons and spindle jointly defining three separate chambers within said bore, said three chambers consisting of a center chamber, one end chamber proximate said one end of the bore, another chamber at an opposite end of said bore, a compression spring in one of said chambers biasing the paired pistons axially toward said nozzlepiece, the nozzle orifice communicating with said one end chamber disposed proximate the one end of said bore and proximate the nozzlepiece, the body having an inlet port in communication with the interior of said center chamber for introducing into said interior one of the substances under pressure for delivery through the nozzle orifice and to compress the spring thereby tending to move the pistons in a direction away from the nozzlepiece, the body having a passageway providing communication between the center chamber into which the substance is introduced under pressure for passage in the direction of the nozzle orifice under pressure past one piston and into said one end chamber, a stop in said one end chamber providing an outlet from said one end chamber in communication with said orifice and constantly kept closed by a piston of the paired pistons under control of the compression spring, and said stop limiting axial movement of said piston toward the nozzlepiece, whereby flow of the substance from the inlet part to said one end chamber and into the nozzle orifice is regulated and reduced in pressure when the substance is introduced and the compression spring is compressed and the outlet is opened by movement of the paired piston in a direction away from the nozzlepiece.

2. A pressure reducer-regulator for dispensing gaseous, liquid, viscous, powdery or pasty substances according to claim 1, in which said spring is disposed in said another end chamber for biasing the two pistons toward the nozzlepiece.

3. A pressure reducer-regulator for dispensing gaseous, liquid, viscous, powdery or pasty substances according to claim 2, in which said spring is disposed in another end chamber bearing directly on a piston more remote from the nozzlepiece than the other of the two pistons.

4. A pressure reducer-regulator for dispensing gaseous, liquid, viscous, powdery or pasty substances according to claim 3, in which said inlet port is disposed for inlet directly into said center chamber, and the center chamber is defined between the axially spaced pistons.

5. A pressure reducer-regulator for dispensing gaseous, liquid, viscous, powdery or pasty substances according to claim 3, wherein said stop provides a means for mounting a deformable seal circumferentially of said outlet from said one end chamber, and said spring continuously biasing the joined pistons so that a piston continuously bears on the seal closing the outlet in communication with the orifice in the absence of compression of said spring by introduction of one of the substances under pressure.

6. A pressure reducer-regulator for dispensing gaseous, liquid, viscous, powdery or pasty substances comprising, a body having an internal cylindrical bore therein, two paired pistons integrally connected disposed reciprocable in said bore, a nozzlepiece at one end of the bore having a nozzle orifice, each of said two pistons defining a corresponding end of the paired pistons, a spindle integrally connecting the two pistons axially spaced from each other and having a diameter less than either piston diameter, the axially spaced paired pistons and spindle jointly defining two separate chambers within said bore, said chambers consisting of one end chamber proximate said one end of the bore in which is disposed one piston and another chamber at an opposite end of said bore in which is disposed the other piston, a compression spring in said another chamber bearing against said other piston biasing the paired pistons axially away from said nozzlepiece, the nozzlepiece orifice communicating with said one end chamber disposed proximate the one end of said bore and proximate the nozzlepiece, the body having an axial inlet port in communication with the interior of said another chamber for introducing into said interior one of the substances under pressure for delivery through the nozzle orifice and to compress the spring and the introduced substance tending to move the pistons in a direction toward the nozzlepiece, the body having a passageway providing communication between the another chamber into which the substance is introduced under pressure for passage in the direction of the nozzle orifice under pressure past said other piston closest to said inlet port and into which another chamber, a stop in said body bore between the chambers limiting axial movement of said one piston toward the nozzlepiece, the stop having an opening through which extends the spindle with clearance for allowing the substance to pass therethrough, and means for defining a communication passageway on said spindle from said another chamber into the said one chamber including when the pistons are biased toward the stop, whereby flow of the substance from the another chamber to said one chamber and into the nozzle orifice is regulated and reduced in pressure for delivery at the nozzle orifice.

7. A pressure reducer-regulator for dispensing a gaseous, liquid, viscous, powdery or pasty produce, comprising a body (40) having a cylindrical bore (43) therein, in which is disposed a slide having a piston (49) provided with an elastically deformable segment (52), a first stop in the bore, and a compression spring (55) under compression between an end of the bore and the piston (49), and, at rest, biasing a shoulder of the slide that is spaced from the piston up against said first stop (53), and said bore (43) having a first axial port (45) opening out on the side of the piston opposite the spring (55) and communicating with a source of said product under high pressure, wherein the bore (43) has a radial port in the region of the segment (52) of the piston and defining a low-pressure outlet, the radial port consisting of at least one longitudinal slit (58) in the wall of the bore (43) and extending on either side of the segment (52) in the position of the rest of the piston, the stroke of the slide moving the piston (49) in the direction of the spring (55) being limited by a second stop (57), such that, when the slide is up against the second stop, the passage through the longitudinal slit (58) is not completely closed, the longitudinal slit (58) extending on either side of the segment (52) of the piston, the first stop retaining the piston at rest consists of an annular shoulder (53) in the bore of the body (40), and wherein a gasket (54) is arranged axially between the first stop (53) and the shoulder (50) of the slide, to ensure sealing of the bore (43) in said position of rest corresponding to an initial position of the piston.

* * * * *